(12) United States Patent
Akeel et al.

(10) Patent No.: US 10,556,347 B2
(45) Date of Patent: Feb. 11, 2020

(54) VISION GUIDED ROBOT PATH PROGRAMMING

(71) Applicant: Brachium, Inc., San Ramon, CA (US)

(72) Inventors: Hadi Akeel, Fort Lauderdale, FL (US); Yongxiang Fan, El Cerrito, CA (US)

(73) Assignee: Brachium, Inc., San Ramon, CA (US)

( * ) Notice: Subject to any disclaimer, the term of this patent is extended or adjusted under 35 U.S.C. 154(b) by 349 days.

(21) Appl. No.: 15/800,623

(22) Filed: Nov. 1, 2017

(65) Prior Publication Data
US 2019/0047145 A1  Feb. 14, 2019

Related U.S. Application Data

(60) Provisional application No. 62/415,737, filed on Nov. 1, 2016.

(51) Int. Cl.
   *B25J 9/16*  (2006.01)

(52) U.S. Cl.
   CPC .............. *B25J 9/1697* (2013.01); *B25J 9/163* (2013.01); *G05B 2219/40499* (2013.01)

(58) Field of Classification Search
   CPC ....... A61C 9/0053; B25J 9/163; B25J 9/1664; B25J 9/1667; G05B 2219/36415; G05B 2219/36442; G05B 2219/37288; G05B 2219/40499; G05B 2219/40564; G05B 2219/45167; G06T 2207/10028; G06T 2207/30036; G06T 2219/2004
   See application file for complete search history.

(56) References Cited

U.S. PATENT DOCUMENTS

| | | | |
|---|---|---|---|
| 9,675,419 B2 | 6/2017 | Akeel et al. | |
| 10,417,774 B2* | 9/2019 | Salah | A61B 5/0062 |
| 2003/0078694 A1* | 4/2003 | Watanabe | B25J 9/1697 |
| | | | 700/245 |
| 2006/0063135 A1* | 3/2006 | Mehl | G05B 19/4097 |
| | | | 433/223 |

(Continued)

FOREIGN PATENT DOCUMENTS

| | | |
|---|---|---|
| CA | 2150844 A1 | 8/1996 |
| CN | 103192386 | 7/2013 |

(Continued)

OTHER PUBLICATIONS

Written Opinion PCT/US18/58801, Brachium Labs Mar. 28, 2019.

(Continued)

*Primary Examiner* — Dale Moyer
(74) *Attorney, Agent, or Firm* — William J. Clemens; Shumaker, Loop & Kendrick, LLP

(57) ABSTRACT

A method to automate the process of teaching by allowing the robot to compare a live image of the work space along the desired path with a reference image of a similar workspace associated with a nominal path approximating the desired path, the robot teaches itself by comparing the reference image to the live image and generating the desired path at the desired location, hence eliminating human involvement in the process with most of its shortcomings. The present invention also overcomes the problem of site displacement or distortion by monitoring its progress along the path by sensors and modifying the path to conform to the desired path.

20 Claims, 7 Drawing Sheets

Nominal 4th order curve and actual 4th order curve

(56) References Cited

U.S. PATENT DOCUMENTS

| | | | |
|---|---|---|---|
| 2008/0206710 A1* | 8/2008 | Kruth | A61C 13/0018 |
| | | | 433/174 |
| 2013/0110469 A1* | 5/2013 | Kopelman | G06T 19/20 |
| | | | 703/1 |
| 2015/0057675 A1 | 2/2015 | Akeel et al. | |
| 2017/0020636 A1* | 1/2017 | Akeel | A61B 1/00172 |
| 2018/0126547 A1* | 5/2018 | Corkum | B25J 9/1697 |

FOREIGN PATENT DOCUMENTS

| | | |
|---|---|---|
| CN | 107194991 | 9/2017 |
| WO | 2015058297 A1 | 4/2015 |

OTHER PUBLICATIONS

Fusong Yuan et al. An automatic tooth preparation technique: A preliminary study, Scientific Reports, Apr. 29, 2016.
Int. Search Rpt. PCT/US18/58801, Brachium Labs.

* cited by examiner

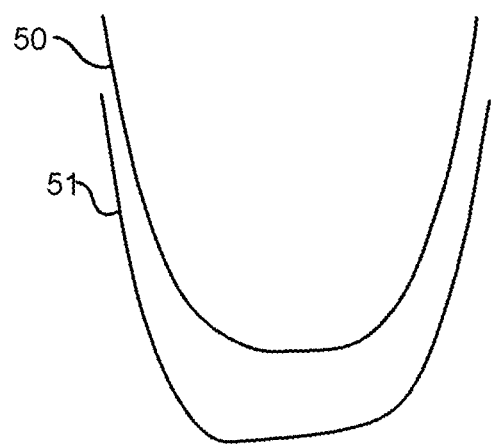 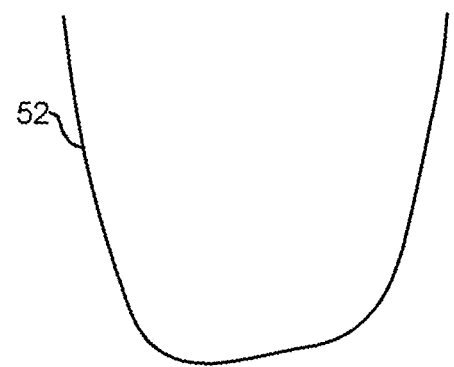
Fig. 7A  Fig. 7B

Nominal 4th order curve
and actual 4th order curve

3rd order mapping

VISION GUIDED ROBOT PATH PROGRAMMING

This application is related to, and claims priority from, U.S. Provisional patent application No. 62/415,737 filed Nov. 1, 2016. Application 62/415,737 is hereby incorporated by reference in its entirety.

BACKGROUND

Field of the Invention

The present invention relates generally to the field of dental robotic scanning and more particularly vision guided robot path programming.

Description of the Problem Solved

There are several methods for programming a robot to trace a certain geometric path in space as it carries and operates a tool along its path and executes some processing operations; the following are common approaches:

Teach pendant programming: The robot is commanded by means of a hand-held device, a teach pendant, to move to desired points along the path and to trigger a process tool at selected points along the path such as gripping an article, spraying paint, operating a welding gun and the like. The teach pendant moves the robot arm by sending jogging commands either to move along or rotate around three Cartesian coordinates X, Y and Z. Points along the path, representing the absolute or incremental values of the position of each robot joint, are recorded together with associated process commands. Mathematical operations are executed by the robot controller to generate a smooth continuous path that traces those discrete points. When playing back the recorded path, the robot moves along the same path and executes the process commands at the assigned locations.

Computer-aided design (CAD) path programming: A virtual representation of the robot is displayed on a computer screen and manipulated like a physical robot. The virtual model is commanded to move along the desired path in space, and points along the path, representing robot joint locations, are recorded together with process commands. The recorded points are then conveyed to the physical robot to be executed as they are in teach pendant generated programs.

Lead-through teach programming: The robot, or a geometrically identical mechanism, is moved manually or by a force sensing handle along the desired path as points along the path are recorded and process operation location identified. The resulting program is then generated as if the motion was commanded through the teach pendant and then played back to perform a processing operation.

Each of these methods require an operator to guide the robot along the desired path, physically or virtually, and must be performed every time the robot is programmed along a different path, with a different tool or at a new location. The robot must also be calibrated to register the location of the path. This is time consuming and costly given the expense of the required skilled manual labor, and the need for many programming operations every time the workpiece or its location is changed. Programs may consume several hours of skilled labor time and result in degrading the economics of robot use. In addition the programming task requires investment in expensive training for operators.

These prior art methods are time consuming, costly, labor intensive, require high technical skills, require extensive computer processing operations, depend on human judgement for accurate location, require re-programming for each change of the environment and frequent iterative corrections. For CAD path programming, the work site of the robot must be exactly the same as the site represented by the virtual model, 2D or 3D. If the actual site is displaced or deformed, the path generated virtually does not represent the distorted or displaced site, and the robot will not trace the desired path. Calibration procedures are necessary, or real time correction of the path or its segments must be made to conform to the new site or distortions.

The prior art methods require skilled operators and extensive training on robot programming and operations. They increase robot initial cost for the added programming tools and user interface hardware, and they increase operating cost of automation with robots.

Therefore a robot that can self program would be of great advantage and would make the robot more friendly, easy to use with lower cost to operate. Self programming would also allow the robot to operate on an object as soon as it is presented to it without the need for precise object location. By identifying the object geometry as similar to one in the memory, the robot can modify a memorized path and process requirements; it can then operate on the object autonomously without having to be re-programmed for the object

SUMMARY OF THE INVENTION

Embodiments of the present invention automate the process of teaching by allowing the robot to compare a live image of the workspace along the desired path with a reference image of a similar workspace associated with a nominal path approximating the desired path, the robot then teaches itself by comparing the reference image to the live image and generating the desired path at the desired location eliminating human involvement in the process with most of its shortcomings. The present invention also overcomes the problem of site displacement or distortion by monitoring its progress along the path using sensors and modifying the path to conform to the desired path.

It is therefore an object of the present invention to provide a system and method that allows a robot to self-program.

It is also an object of the invention to provide a method for programming a robot path 1) that is transformable for application to different objects of similar geometries; 2) that is scalable to similar objects of different sizes; 3) that carries process activation parameters from a reference path to a desired path; 4) that helps avoid repetitive path programming of the robot for a family of objects of related geometry; 5) that helps automate the robot path programming process; 6) that avoids the need for precise location of objects when presented to the robot for programming, 7) and that allows the opportunity for robots to operate autonomously without human augmentation.

DESCRIPTION OF THE FIGURES

Attention is now directed to several drawings that illustrate features of the present invention.

FIG. 7A shows a nominal arch and an actual arch before mapping.

FIG. 7B shows the result of mapping.

Several figures and illustrations have been provided to aid in understanding the present invention. The scope of the present invention is not limited to what is shown in the figures.

DESCRIPTION OF THE PREFERRED EMBODIMENTS

Embodiments of the present invention provide a system and method for programming the robot path to be traced on a physical target by the use of sensors, especially vision sensors. They allow the robot to identify the target and generate the desired path once it has the opportunity to recognize a preselected starting point along the path. Using a vision camera mounted on, or close by, the robot, and a reference image of the target having a nominal path associated with the reference image and having a designated starting point, the robot interacts with the vision camera and compares the live image of the target to the reference image and selects a corresponding path starting point on the live image.

Once at the path starting point, the robot vision system superimposes the nominal path on the live image, matching their starting points and their geometric coordinate frames. The robot matches features associated with a first end point of a first segment of the nominal path with features of the live image in the vicinity of the first end point and recognizes an exact end point of a first segment of the desired path. The robot then records the exact end point and moves along the first segment of the desired path.

The robot proceeds to the recorded points, superimposes the reference image, uses the end points of a segment as the starting point of the next segment and repeats the progressive identification of new exact end points along the desired path until the end point of the last segment is attained and the program is then fully recorded. During this process the path is recorded, and its associated program could be fully executed along the way, including activating all process functions. The recorded path points may be used for repetitive execution or for future uses on identical targets.

The nominal path is preferably generated on a reference target of similar geometry as the actual target. It could be generated by any of the conventional teaching methods, physically or virtually. Its function is primarily to help with robot guidance within a limited space close to the form of the target. It also allows all the process parameters to be pre-assigned to locations on the nominal path where and when they are activated and to be duplicated on the desired path.

Sensors other than vision, such as tactile sensors or probes can be used. The sensor recognizes data associated with points ahead of the robot tool, compares their outputs with data associated with the nominal path, corrects the target points of the path and adjusts the robot path accordingly.

Figure 1A:
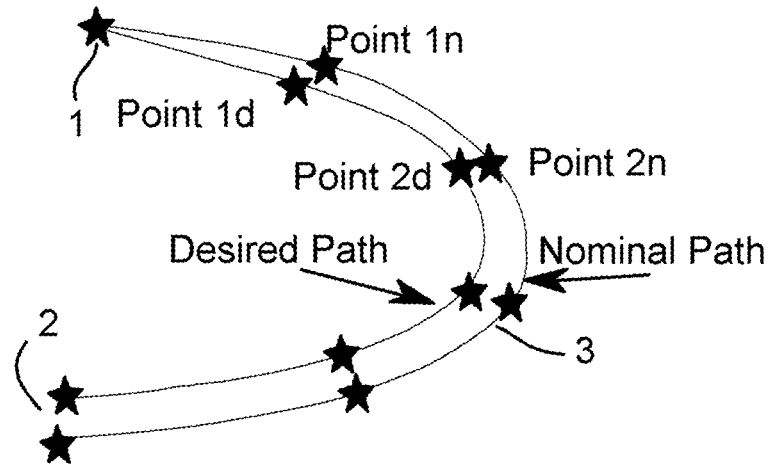
FIG. 1A shows a nominal path and a desired path at the beginning of a scan with the starting points aligned.

This method allows the conventional point by point path teaching, physically or virtually, to be done only once regardless of how many times it is executed on similar, but non identical, targets and whether the targets are in the same or different locations or orientations. FIG. 1A shows the desired path for teaching the robot and the nominal path. Each Path has a starting point 1, end point 2 and segmented into equal number of segments having end points such as 1n, 1d and 2n, 2d, . . . .

In application the robot vision system is given a nominal image to approximate the desired path marked in FIG. 1A as Nominal Path 3. The starting point 1 is also identified on the image of the desired path from common features recognized by the vision system. Such features could be any geometric or optical feature such as a contrast of shades, intersecting lines, circles, squares or any geometrically identifiable feature.

It is typically assumed that the nominal and desired paths proceed through similar environments with similar features, such as the surface of the teeth of a human jaw, or similarly shaped or textured objects but of differing sizes. Hence features can be recognized by the vision system at similar intervals along each path.

Figure 1B:
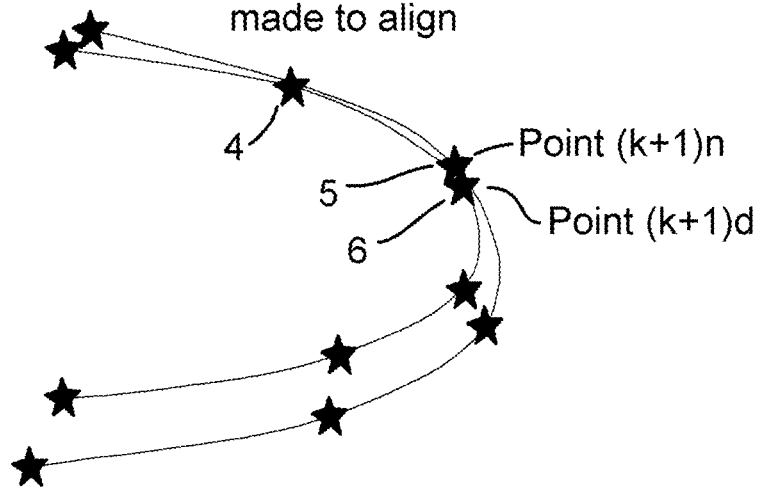
FIG. 1B shows a nominal path and desired path aligned at points kn and kd.

The robot moves to the starting point 1 on the desired path. The vision system then superimposes the nominal image that defines a trajectory for movement from the common starting points Sn, Sd, to the next target point, 1n on the nominal path and identifies the next target point of the desired path such as 1d from similar features in the vicinity of the approximate point 1n. Once point 1d is identified the robot records and moves to the desired point 1d, and the vision system superimposes the approximate image by matching points 1n and 1d as shown in FIG. 1B. The next point 2d is then located similarly and the process continues until the end point Ed is recognized and recorded. In other words, once a point, say kd, on the desired path is recognized, the corresponding point kn is aligned with kd 4. The system then moves to point (k+1)n 5 and attempts to locate point (k+1)d 6 which is assumed to be near point (k+1)n by recognizing features in the visual data that identify the correct location of point (k+1)d. Then the point (k+1)n on the nominal path (which may not exactly coincide with the newly located point (k+1)d) is aligned with (k+1)d moving the nominal path slightly. The process then repeats until the entire path is recorded.

At each end point, as well as intermediate points, process trigger points recorded at points on the nominal path may be added to the corresponding points on the desired path program. In operation, the robot recognizes the starting point by vision guidance, then traces the recorded path and executes a process by activating the process trigger points along the path.

It should be noted that once at the starting point, the vision system may also compare the image it views in front of the robot to the approximate image and recognize the desired path from the given approximate form. The robot may then proceed along the desired path recording points as it moves along. For example for welding two plates, the image may be a straight line defining their mating surfaces. Once these are recognized, the robot can be commanded to keep the torch in contact with the line defining the mating surfaces and record exact points along that line. Accordingly, the robot can learn to correct the approximate image of the desired path as it moves along the desired path sequentially learning the next segments ahead of it until the desired path is accurately and fully recorded. It should be noted that the desired path is not only defined by a line in a plane, but may have 3D geometry referenced to a given geometric reference frame.

On occasions, the end point of a segment may not be recognized by the vision system in order to command the robot to proceed to such. This could happen as the case of a missing tooth on the arch being scanned. In such case, the vision algorithm may include conditional commands to allow the vision system to look ahead for the next segment end point and proceed as usual. Alternately, the path segments may be shortened or lengthened based on whether the expected features at the end point are found or not, hence accommodating a single or multiple missing teeth in a dental scan.

In another embodiment, the process of superimposing the nominal path on the live image can be realized by mapping the geometric form of the nominal path on the live image rather than the progressive identification of points along the path. In this embodiment, the process involves the generation of a mapping transform between a nominal image having a nominal path to the actual image and applying the same mapping transform to the nominal path to generate an desired path. This can be done in real time while the robot is executing the path to track the movements of the real image.

Commercially available vision cameras are available with different 3D image generation technologies. For example, the Kinect camera can generate 3D images using Time-of-Flight (TOF) technology and also includes a red-green-blue (RGB) color imaging camera [2]. 3D images can be generated by TOF cameras from a single image. 2D camera can also be used to generate 3D images when stereo imaging is applied to two images taken from two displaced positions. Combining TOF and RGB images for the same object can also enhance the results of the 3D images in certain applications when lighting limitations or obscuring objects are encountered.

Cartesian Space Path Mapping

Figure 2:
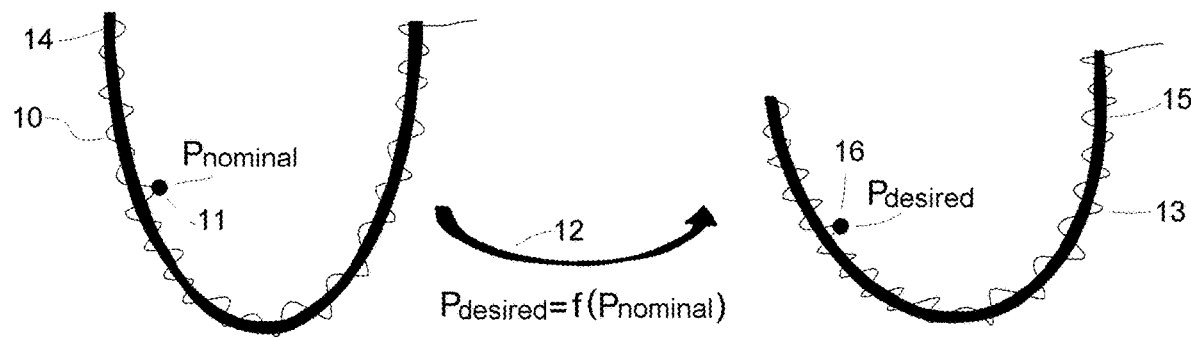
FIG. 2 shows a Cartesian space path mapping between a nominal path and a desired path.

The purpose of the mapping is to provide desored path for robot tracking based on a nominal Cartesian path as shown in FIG. 2. The left part of FIG. 2 shows the nominal arch 14 (thick line) and trained path by human experts 10 (slim line). The right figure shows the actual arch 15 for the current patient. The task is to map the nominal path 10 for nominal arch 14 to the correct path 13 for this specific patient. The point Pnominal 11 on the nominal path 10 is mapped to the point Pdesired 16 by the mapping 12.

The mapping function is found by mapping the nominal dental arch to the actual arch for a specific patient. The procedure is illustrated in the block diagram of FIG. 3. For both the nominal arch and the actual arch the first step is Pose Estimation 20*a*, 20*b*. Next Pose Correction 21*a*, 21*b* followed by Skeleton Extraction 22*a*, 22*b*. Next, the resulting curves are discretized into a set of N points 23. These points are then used to generate a mapping matrix 25 using 3rd order least squares mapping 24 or any other techniques that can map the points into a transformation matrix.

Figure 3:
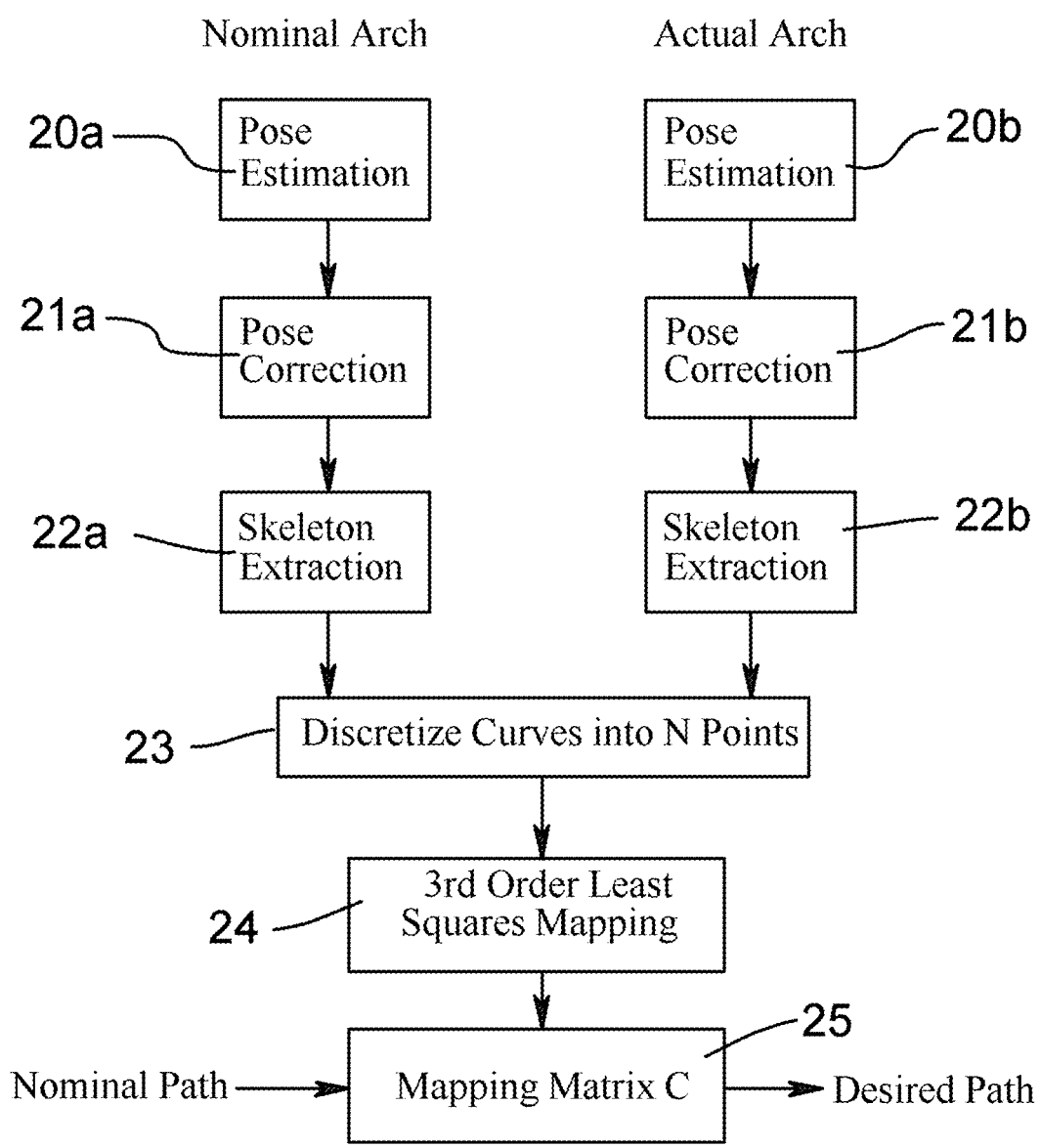
FIG. 3 shows a block diagram of how a Cartesian path mapping is generated.
Figure 4:
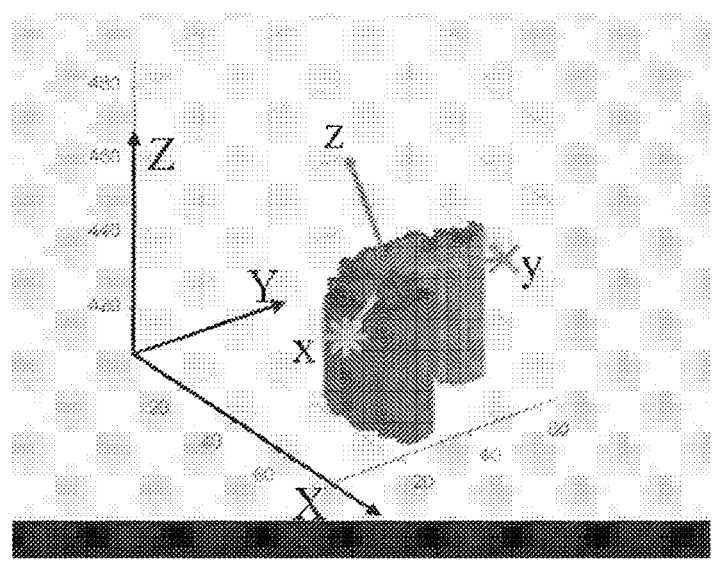
FIG. 4 shows pose correction using a 3-D pose estimation.
Figure 5:
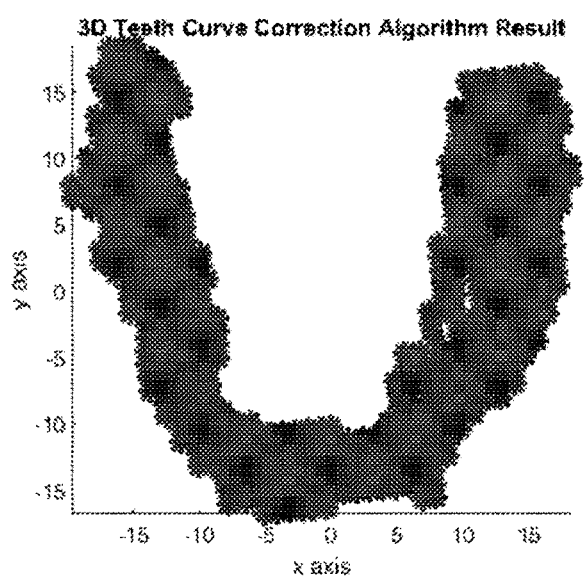
FIG. 5 shows the a 2-D representation of the arch from FIG. 4 with the oblique removed.

For an arbitrary arch that is segmented by the method of FIG. 3, its position and orientation can be estimated by pose estimation using eigen-decomposition. Then the pose correction is conducted to remove the oblique. The pose estimation and correction are demonstrated by FIG. 4 which shows the 3D arch pose estimation. The estimated local frame is shown by x-y-z, while the world frame is indicated by X-Y-Z. FIG. 5 shows the arch that has the oblique removed, which is called the standard arch. The coordinates in FIG. 5 are x-y from the local frame.

Figure 6A:
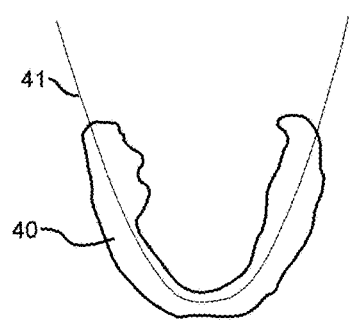
FIG. 6A shows the first step in skeleton extraction by pre-fitting a 2nd order polynomial to the arch.
Figure 6B:
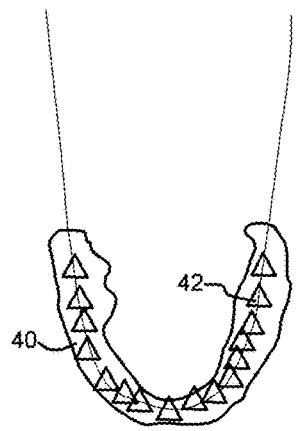
FIG. 6B shows the second step in skeleton extraction using a slope-based piecewise segmentation.
Figure 6C:
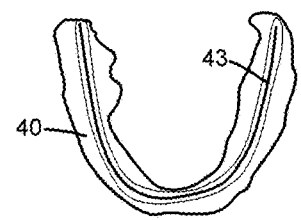
FIG. 6C shows the third step in skeleton extraction using a 4th order polynomial fit to the points in FIG. 6B.

The skeleton extraction algorithm mathematically fits 4th order polynomials [2] to represent the nominal standard arch and the actual standard arch. FIGS. 6A, 6B and 6C show three steps in skeleton extraction. FIG. 6A shows a 2nd order pre-fitting. The irregular region 40 represents the arch. The curve 41 is a parabola or 2nd order curve. FIG. 6B shows a slope based piecewise segmentation with points 42, and FIG. 6C shows a 4th order re-fitting result 43.

Based on the 4th order polynomial fitting results, a 3rd order least squares mapping is applied to map the nominal polynomial onto actual polynomial. The mapping result is demonstrated in FIGS. 7A and 7B.

FIG. 7A shows the fitted nominal arch 50 and the fitted actual arch 51 before executing the mapping. As stated, the nominal arch and the actual arch are parameterized by 4th order curves. FIG. 7B shows the result of mapping the nominal arch to the actual arch 52 by 3rd order least squares fitting. The actual arch and the final mapped fitted arch coincide after mapping, with a low least squares fitting error. A preferred overall fitting error is around 2.2525e-12 or less.

The calculated mapping function can then be applied to map the nominal path to the desired path. A mapping result is shown in FIGS. 8A and 8B.

Figure 8A:
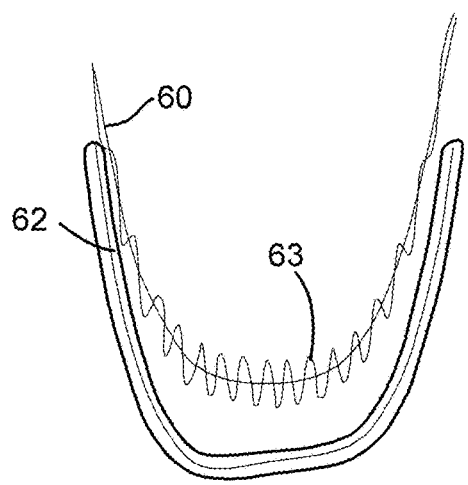
FIG. 8A shows a nominal 4th order curve, an actual 4th order curve and a nominal trajectory.
Figure 8B:
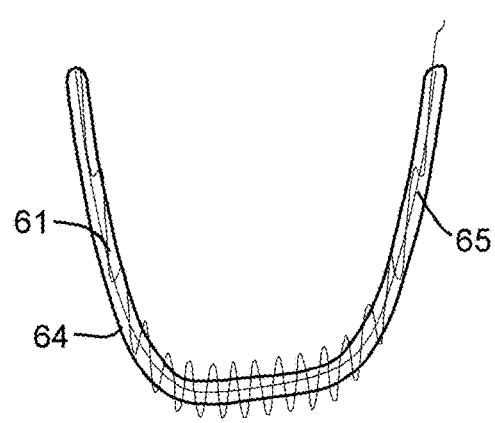
FIG. 8B shows the result of a mapping.

FIG. 8A shows the nominal 4th order curve 60, the actual 4th order curve 62 and the nominal path 63. The final task is to map this nominal path 63 (generated by human expert guidance) to generate the desired path 61 shown in FIG. 8B that fits the actual arch 64. FIG. 8B is the result of the mapping. The mapped (fitted) 4th order curve 65 can also be seen in FIG. 8B. It is assumed that the nominal arch and nominal path share the same mapping.

Sample Algorithms

These are vision based robot programming methods for generating an actual robot path program for an actual object based on prior knowledge of an approximate form of a similar object.

A first sample algorithm is as follows:
a) fitting a robot with a vision system for guiding the robot;
b) providing the vision system with a nominal object image having a nominal path referenced to a robot geometric reference frame FR;
c) segmenting the nominal object image and the nominal path into a plurality of segments X and identifying a start point Sn, a plurality of intermediate points Xn, and an end point En for the nominal path;
d) commanding the robot to approach an actual object;
e) generating an actual object image of the actual object by the vision system referenced to the geometric reference frame of the robot FR;
f) comparing the actual object image to the nominal object image and identifying a desired starting point Sd for the actual tool path matching the nominal starting point Sn of the nominal path;
g) superimposing the nominal object image on the actual object image with points Sd and Sn coinciding with a shift between the object image and the actual object image representing the difference between the nominal and actual objects;

h) comparing features of the actual object image in the vicinity of point 1n, and identifying and recording a corresponding point 1d on an actual path;
i) commanding the robot to move to point 1d;
j) shifting the nominal path image such that points 1n and 1d coincide;
k) repeating steps f to i to identify and record points 2d to Ed as the tool moves successively between points recognized and recorded on the actual path;
l) terminating the process when the tool reaches point Ed and the desired path is fully recorded.

In addition:
a. Activation points for Process commands can be recorded along the path.
b. The process can be ProphyJet™ cleaning along the arch of a human jaw.
c. The process can be a 3D imaging scan along the arch of a human jaw.
d. The process can be a crown milling procedure at a tooth location along the arch of a human jaw.
e. The process can be one of Arc or spot Welding, edge flashing, grinding, cutting, Painting, or Sealing.

The process as described where the steps d through k are repeated at small time intervals, hence allowing the robot to recognize small shifts in the location of the actual object and track its movements.

In an alternate embodiment of the present invention, a second algorithm may be used.

A second sample algorithm is as follows:
a. Generating a nominal image of the approximate form by a vision system;
b. Identifying a skeleton of the nominal image mathematically;
c. Teaching the robot a nominal path to trace desired locations along the approximate form;
d. Generating an actual image of the actual object;
e. Identifying a skeleton of the actual image mathematically;
f. Generating a mapping transform to map the skeleton of the nominal image to the skeleton of the actual image;
g. Applying a mapping transform to the nominal path to generate the desired path without the elaborate steps of manually teaching the robot for each new similar object.

In addition:
a. Activation points for Process commands can be recorded along the path.
b. The process can be Prophy Jet™ cleaning along the arch of a human jaw.
c. The process can be a 3D imaging scan along the arch of a human jaw.
d. The process can be a crown milling procedure at a tooth location along the arch of a human jaw.
e. The process can be one of Arc or spot Welding, edge flashing, grinding, cutting, Painting, or Sealing.

In another alternate embodiment of the present invention, a third algorithm may be used.

A third sample algorithm is as follows:
a. Commanding the robot to move from a home location to a starting point of the desired path.
b. Moving the robot along the desired path while generating a series of 3D images of the moving object discretely or continuously in a video track;
c. Comparing one 3D image to a subsequent 3D image at assigned time intervals and generating a path coordinates shift command representing the shift of the moving object between the time intervals;
d. Adjusting the desired path of the robot according to the path coordinates shift command;
e. Continue to execute the desired path as the coordinate system is progressively adjusted according to changes in the 3D image of the moving object;
f. Activating process commands along the desired path;
g. Terminating the process at an end point of the desired path;
h. Withdrawing the robot from the site to the home location.

In this algorithm, predetermined assigned time intervals are used rather than predetermined segment starting and ending points.

In addition:
a. Process activation points and commands can be recorded along the path.
b. The process can be Prophy Jet™ cleaning along the arch of a human jaw.
c. The process can be a 3D imaging scan along the arch of a human jaw.
d. The process can be a crown milling procedure at a tooth location within the arch of a human jaw.
e. The process can be a root canal procedure at a tooth location along the arch of a human jaw.
f. The process can be one of Arc or spot Welding, edge flashing, grinding, cutting, Painting, or Sealing and the object is an article in a manufacturing process.

It is known to those skilled in the art of robotic vision that other methods and algorithms known in the art can be used for modifying the nominal path to fit a vision recognized image of the actual path, notable in such algorithms is the use of the 3D point cloud approach to approximate two images with common characteristics.

Several descriptions and illustrations have been presented to aid in understanding the present invention. One with skill in the art will realize that numerous changes and variations may be made without departing from the spirit of the invention. Each of these changes and variations is within the scope of the present invention.

REFERENCES

[1] Microsoft Kinect Camera, https://msdn.microsoft.com/en-us/library/jj131033.aspx
[2] AlHarbi, Seba, Eman A. Alkofide, and Abdulaziz AlMadi. "Mathematical analyses of dental arch curvature in normal occlusion." *The Angle Orthodontist* 78.2 (2008): 281-287.

We claim:

1. A vision based robot programming method for generating a robot program to follow a desired path on an actual object to move a process tool relative to the actual object based on prior knowledge of a nominal object and a nominal path image on the nominal object, where the nominal object is similar to the actual object, the method comprising:
   supplying a first visual image of a region near a starting point of the desired path on the actual object;
   identifying a starting point 1d on the actual object by comparing features in the visual image of the actual object with data concerning these features on the nominal object;
   aligning a point 1n in the nominal path image with the point 1d in the desired path;
   setting an integer k equal to 1;
   (a) moving the robot to point kd, and recording coordinates of point kd;
   (b) superimposing a (k+1)th visual image that defines a trajectory for movement to a next target point (k+1)d on the desired path in the vicinity of a corresponding approximate point (k+1)n on the nominal path image;

(c) identifying point (k+1)d on the actual object by comparing features in the kth visual image of the actual object with data concerning these features on the nominal object;

(d) aligning point (k+1)n in the nominal path image with point (k+1)d;

incrementing k by 1 and repeating steps (a) to (d) unless k=N, where N is a positive integer;

if k=N, moving the robot to point Nd, recording coordinates of point Nd, and then stopping.

2. The method of claim 1 wherein activation points for process commands are recorded along the desired path.

3. The method of claim 2 wherein the process commands relate to cleaning along an arch of a human jaw.

4. The method of claim 1 wherein the method results in a 3D imaging scan along an arch of a human jaw.

5. The method of claim 2 wherein the process commands relate to a crown milling procedure at a tooth location along an arch of a human jaw.

6. The method of claim 2 wherein the process commands relate to one of arc or spot welding, edge flashing, grinding, cutting, painting, or sealing.

7. A vision based robot programming method for a tool, the method comprising:

(a) fitting a robot with a vision system for guiding the robot;

(b) providing the vision system with a nominal object image having a nominal path referenced to a robot geometric reference frame (FR);

(c) segmenting the nominal object image and the nominal path into a plurality of segments X and identifying a start point Sn, a plurality of intermediate points Xn, and an end point En for the nominal path;

(d) commanding the robot to approach an actual object;

(e) generating an actual object image of the actual object by the vision system referenced to the geometric reference frame of the robot FR;

(f) comparing the actual object image to the nominal object image and identifying a desired starting point Sd for a desired tool path matching the nominal starting point Sn of the nominal path;

(g) superimposing the nominal object image on the actual object image with points Sd and Sn coinciding with a shift between the object image and the actual object image representing the difference between the nominal and actual objects;

(h) comparing features of the actual object image in the vicinity of point N1, and identifying and recording a corresponding point 1$d$ on the desired tool path;

(i) commanding the robot to move to point 1$d$;

(j) shifting the nominal path image such that points 1$n$ and 1$d$ coincide;

(k) repeating steps f to i to identify and record points 2$d$ to Ed as the tool moves successively between points recognized and recorded on the actual tool path;

(l) terminating the process when the tool reaches point Ed and the desired tool path is fully recorded.

8. The method of claim 7 wherein activation points for process commands are recorded along the actual tool path.

9. The method of claim 8 wherein the process commands relate to cleaning along an arch of a human jaw.

10. The method of claim 7 wherein the method results in a 3D imaging scan along an arch of a human jaw.

11. The method of claim 8 wherein the process commands relate to a crown milling procedure at a tooth location along an arch of a human jaw.

12. The method of claim 8 wherein the process commands relate to one of arc or spot welding, edge flashing, grinding, cutting, painting, or sealing.

13. A vision based robot programming method for generating a desired robot path program for a robot for an actual object based on prior knowledge of an approximate form of a similar object comprising the steps of:

generating a nominal image of the approximate form by a vision system;

identifying a skeleton of the nominal image mathematically;

teaching the robot a nominal path to trace nominal locations along the approximate form;

generating an actual image of the actual object;

identifying a skeleton of the actual image mathematically;

generating a mapping transform to map the skeleton of the nominal image to the skeleton of the actual image;

applying the mapping transform to the nominal path on the nominal image to generate the desired path on the actual image.

14. The method of claim 13 wherein the skeleton of the nominal image and the skeleton of the actual image are identified using a 4th order polynomial fit.

15. The method of claim 14 wherein the mapping transform is generated using a 3rd order polynomial least squares fit.

16. The method of claim 13 wherein activation points for process commands are recorded along the desired tool path.

17. The method of claim 16 wherein the process commands relate to cleaning along an arch of a human jaw.

18. The method of claim 16 wherein the method results in a 3D imaging scan along an arch of a human jaw.

19. The method of claim 16 wherein the process commands relate to a crown milling procedure at a tooth location along an arch of a human jaw.

20. A method for using a vision system for guiding a robot to perform a process on a moving object along a desired path referenced to a geometric coordinate system, the method comprising:

commanding the robot to move from a home location to a starting point of the desired path;

moving the robot along the desired path while generating a series of 3D images of the moving object discretely or continuously in a video track comparing one 3D image to a subsequent 3D image at predetermined time intervals and generating a path coordinates shift command representing the shift of the moving object between the time intervals;

adjusting the desired path of the robot according to the path coordinates shift command;

continuing to execute the desired path as the coordinate system is progressively adjusted according to changes in the 3D image of the moving object;

activating predetermined process commands along the desired path;

terminating the process at an end point of the desired path.

* * * * *